United States Patent
Cullison

(10) Patent No.: US 9,138,876 B2
(45) Date of Patent: Sep. 22, 2015

(54) TORQUE MULTIPLIER AND METHOD OF USE

(71) Applicant: Robert F. Cullison, Caledonia, MI (US)

(72) Inventor: Robert F. Cullison, Caledonia, MI (US)

(*) Notice: Subject to any disclaimer, the term of this patent is extended or adjusted under 35 U.S.C. 154(b) by 279 days.

(21) Appl. No.: 13/927,749

(22) Filed: Jun. 26, 2013

(65) Prior Publication Data

US 2014/0020520 A1 Jan. 23, 2014

Related U.S. Application Data

(60) Provisional application No. 61/673,761, filed on Jul. 20, 2012.

(51) Int. Cl.
| | |
|---|---|
| *B25B 17/02* | (2006.01) |
| *B25B 23/153* | (2006.01) |
| *B25B 23/00* | (2006.01) |
| *B25B 23/142* | (2006.01) |
| *B25B 23/14* | (2006.01) |
| *B25B 17/00* | (2006.01) |
| *B60B 29/00* | (2006.01) |

(52) U.S. Cl.
CPC ............ *B25B 17/02* (2013.01); *B25B 17/00* (2013.01); *B25B 23/0007* (2013.01); *B25B 23/142* (2013.01); *B25B 23/1415* (2013.01); *B60B 29/005* (2013.01)

(58) Field of Classification Search
CPC .... B25B 17/02; B25B 23/0007; B25B 23/14; B25B 23/141; B25B 23/142; B25B 23/1415; B25B 27/0035; B25B 17/00; B60B 29/005
USPC .......................................... 81/480, 471, 57.3
See application file for complete search history.

(56) References Cited

U.S. PATENT DOCUMENTS

| | | | | |
|---|---|---|---|---|
| 1,711,694 | A | * | 5/1929 | Saffold .......................... 81/58.3 |
| 3,753,625 | A | * | 8/1973 | Fabrizio et al. ................. 81/471 |
| 3,830,119 | A | | 8/1974 | Travis |
| 3,979,965 | A | | 9/1976 | Vuceta |

(Continued)

FOREIGN PATENT DOCUMENTS

| | | |
|---|---|---|
| WO | 9702928 | 1/1997 |
| WO | 2005073122 | 8/2005 |

OTHER PUBLICATIONS

X-4 Tool Division, a division of Geartronics Industries Incorporated. Printed Jul. 13, 2012. "X-4 Torque Multipliers." http://www.geartronics.com/x4home.htm. 5 pages.

*Primary Examiner* — Hadi Shakeri
(74) *Attorney, Agent, or Firm* — Price Heneveld LLP

(57) ABSTRACT

A torque multiplier apparatus includes an input pinion, a geared torque multiplier mechanism, and an input retainer. The input pinion and the input retainer include first and second identical connectors so that a detent stud can be positioned in either one of the first and second connectors, allowing the torque multiplier to be used for increased torque (and reduced speed) or for increased speed (and lesser torque). A related method includes engaging the driving tool with the first connector and the socket with the second connector to provide an increased torque on a socket to break loose a fastener, and flipping the torque multiplier so that the driving tool engages the second connector and the socket engages the first connector to provide an increased speed of torsional rotation to more quickly remove the fastener from the shaft. The detent stud is torsionally shearable, thus preventing overstressing and damaging the tool.

9 Claims, 3 Drawing Sheets

(56) References Cited

U.S. PATENT DOCUMENTS

| | | |
|---|---|---|
| 3,992,964 A | 11/1976 | Osmond |
| 4,043,228 A * | 8/1977 | Venezio .................... 81/57.3 |
| 4,627,310 A | 12/1986 | Coburn |
| 5,125,297 A | 6/1992 | Bai et al. |
| 5,176,047 A | 1/1993 | Bai et al. |
| 6,012,359 A | 1/2000 | Lin |
| 7,611,127 B1 * | 11/2009 | Moore ..................... 254/93 R |
| 2008/0047401 A1 * | 2/2008 | Lu ................... 81/471 |
| 2011/0036206 A1 | 2/2011 | Yang |

\* cited by examiner

TORQUE MULTIPLIER AND METHOD OF USE

This application claims benefit under 35 USC §119(e) of provisional application Ser. No. 61/673,761, filed Jul. 20, 2012, entitled TORQUE MULTIPLIER AND METHOD OF USE, the entire contents of which are incorporated herein by reference.

BACKGROUND

The present invention relates to torque multipliers, and more particularly relates to a first tool useful for multiplying torque applied by a mating second tool, the first tool being reversible so that the torque can be multiplicatively increased (resulting in reduced torsional speed) or decreased (resulting in increased torsional speed).

Torque multiplier tools are known. However, improvements are desired in terms of robustness of the assembly, and multi-functionality so that the tool can be used both for applying increased output torque (with lower speed output) for initially breaking loose a fastener from a tightened position, and for applying a decreased output torque (with higher speed output) for rapidly removing the fastener along a threaded shaft. Alternatively, it is desired to have a tool that can be used to rapidly thread a fastener onto a shaft, and then apply high torque to finally tighten the fastener. Also, it is desired that the torque multiplier tool be configured to handle stress in a way that minimizes damage upon over-application of pressure to the tool.

SUMMARY OF THE PRESENT INVENTION

In one aspect of the present invention, a method includes providing a torque multiplier with first and second identical input/output connectors operatively connected by a torque multiplying mechanism, a driving tool, and a socket. The method further includes engaging the driving tool with the first connector and the socket with the second connector, engaging the socket on a fastener, and operating the driving tool to provide an increased torque on the socket to break loose the fastener from a tight position, thereafter flipping the torque multiplier so that the driving tool engages the second connector and the socket engages the first connector, and operating the driving tool to provide an increased speed of torsional rotation to run the fastener along a fastener-engaged shaft to more quickly remove the fastener from the shaft.

In another aspect of the present invention, an apparatus includes a torque multiplier apparatus comprising an input pinion, an input carrier, at least three planet pinion gears, a gear housing head, an input retainer, and a long handle. The input carrier, pinion gears, gear housing head and input retainer operably engage and form a torque multiplier mechanism. The input pinion and the input retainer include first and second connectors respectively, with the first and second connectors having an identical shape and size. A square-shafted detent stud can be positioned in either one of the first and second connectors, with the detent stud being adapted to replicate a driving stub end of a driving tool. By this arrangement, an increased torque output can be achieved with reduced rotational speed by positioning the detent stud in one of the first and second connectors and the driving tool in the other of the first and second connectors, or alternatively, a reduced torque output can be achieved with increased rotational speed by positioning the detent stud in another of the first and second connectors and the driving tool in the other of the first and second connectors.

In another aspect of the present invention, a torque multiplier apparatus includes an input connector, an output connector, and a torque multiplier mechanism connecting the input and output connectors, and a detent stud positioned in one of the first and second connectors, with the detent stud being adapted to replicate a driving stub end of a driving tool, and with the detent stud having a shear strength less than the torque multiplier mechanism. By this arrangement, over-torque stress applied to the detent stud and the torque multiplier mechanism results in shearing of the detent stud prior to damage occurring to the torque multiplier mechanism.

In another aspect of the present invention, a torque multiplier apparatus includes a torque multiplier tool having input and output ends and that is designed to withstand a maximum stress level, and an over-stress-preventing stud attached to one of the input and output ends, with the over-stress-preventing stud being made to rotationally fail at a safe stress level that is lower than the maximum stress level.

An object of the present invention is to provide a torque multiplier tool that can be selectively used to apply increased torque or used to apply a faster rotational action (with reduced torque).

An object of the present invention is to provide a torque multiplier tool with integral over-torque preventing device, and where the over-torque preventing device is low cost, easily replaced, and intuitively positioned.

An object of the present invention is to provide a torque multiplier tool with integral over-torque preventing device, where the over-torque preventing device fails in a non-catastrophic manner for increased safety for the user. For example, the present detent stud, when over-stressed, is designed to fail with a torsional tearing action that distributes the force-versus-resistance curve. Thus, it avoids a sharp snap and quick release of torque-resisting forces, which can surprise a user and cause the user to lose their balance.

These and other aspects, objects, and features of the present invention will be understood and appreciated by those skilled in the art upon studying the following specification, claims, and appended drawings.

DETAILED DESCRIPTION OF PREFERRED EMBODIMENTS

Figure 1:
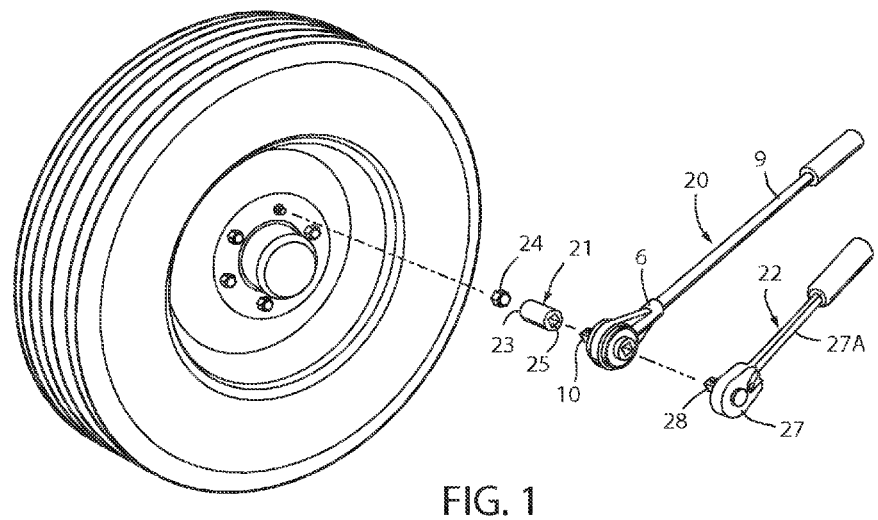
FIG. 1 is an exploded perspective view showing an exemplary torque multiplier used with a socket and driving tool. The illustration shows the exemplary torque multiplier tool being used to remove a lug nut on a vehicle wheel, but a scope of the present invention is believed to be broader than just that particular application.
Figure 2A:
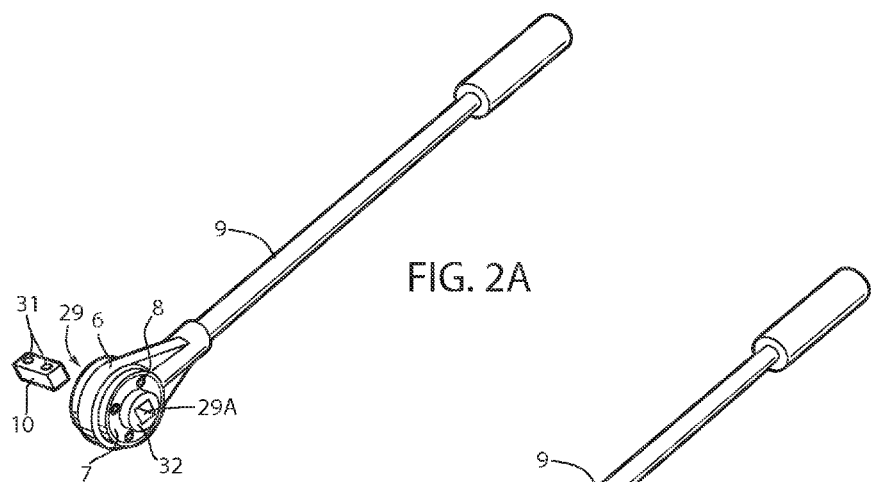
FIGS. 2A-2B are exploded perspective views showing opposite sides of the torque multiplier in FIG. 1.
Figure 2B:
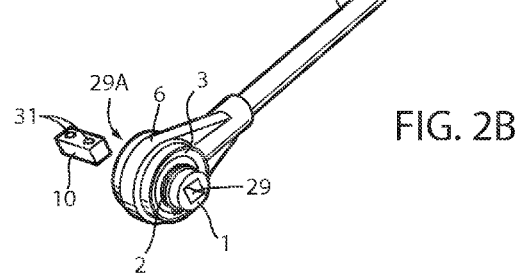

The present apparatus 20 (FIGS. 1, 2A, 2B) (also called a "torque multiplier tool") can be used with a socket 21 and driving tool 22 (e.g. ratchet wrench) to apply an increased torque for initially breaking loose (or tightening) a fastener from a tightened position, and then (or alternatively) flipped (i.e. inverted 180 degrees) for thereafter rapidly removing (or assembling) the fastener along a threaded shaft.

The socket 21 (FIG. 1) includes a body with a first socket opening 23 (connector) on its first end for engaging a fastener, such as a retainer nut (illustrated as a lug nut 24 for securing a vehicle wheel to a vehicle), and a second socket opening 25 (connector) on its other end for engaging a square-shafted double detent stud 10 of the torque multiplier tool 20. A size and shape of the detent stud 10 is standardized in the tool industry.

The driving tool 22 (FIG. 1) includes a ratchet body end 27 with square-shafted protrusion 28 having a shape similar to the detent stud 10, and a long handle 27A extending from the ratchet body end 27 for leverage.

Figure 3:
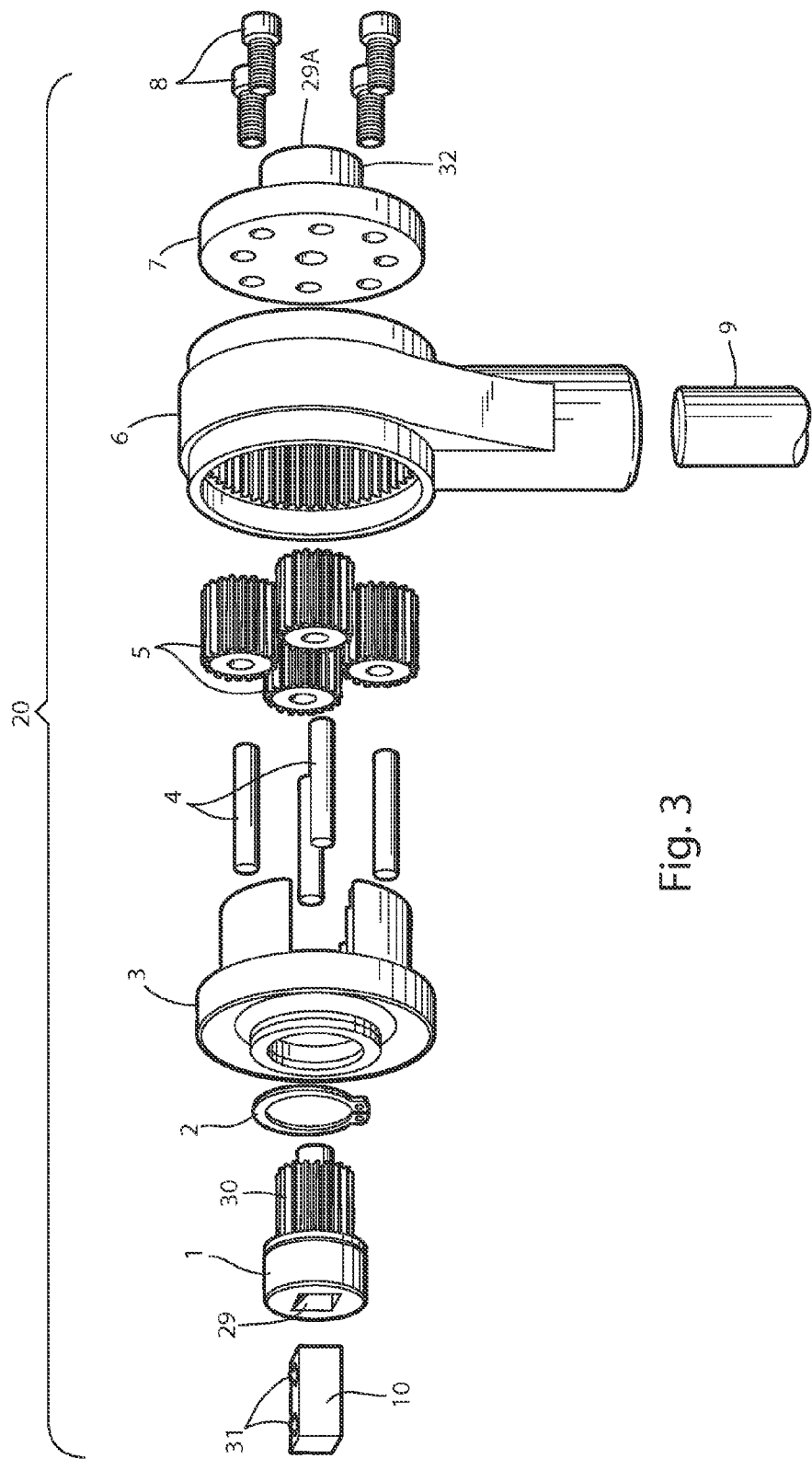
FIG. 3 is an exploded perspective view of the torque multiplier tool of FIGS. 1-2B.
Figure 4:
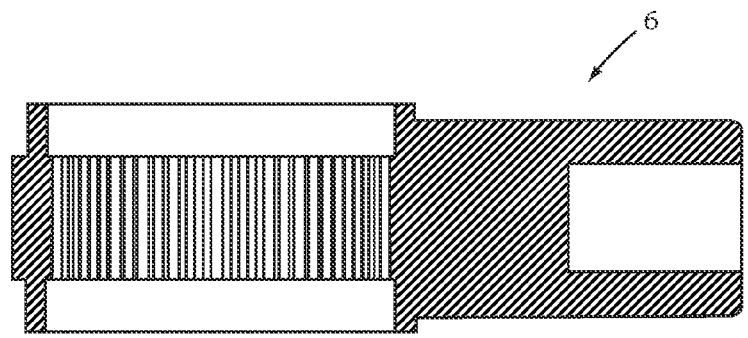
FIGS. 4-5 are side cross sectional and top views of the head of the tool of FIG. 2.
Figure 5:
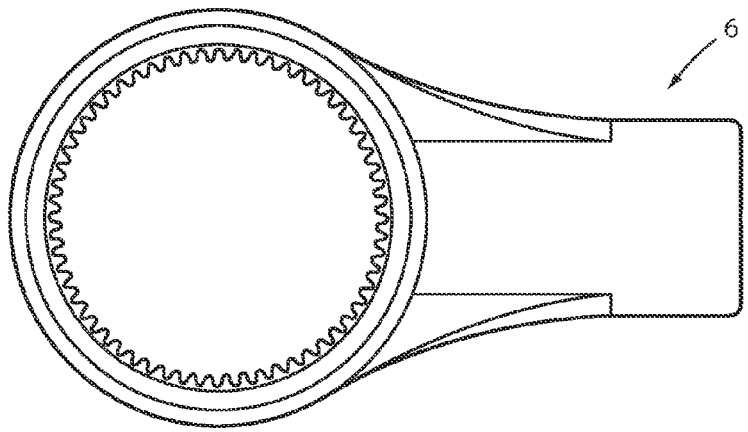

The torque multiplier apparatus 20 (FIGS. 2A, 2B, 3) is configured with opposing identical socket openings 29 and 29A of identical shape and size, each of which are configured to matingly engage the detent stud 10. The detent stud 10 has a square cross section and includes two outwardly-spring-biased ball detents 31. A size and shape of the stud 10 and ball detents 31 replicates a standardized shape common in socket wrenches, so that it can be used with existing tools of mechanics and auto repair shapes and on-vehicle spare tire tool kits.

By this arrangement, the apparatus 20 can be positioned in a first orientation so that when driven with the driving tool 22 engaging the first socket opening 29, the second socket opening 29A (and detent stud 10 and socket 21 and fastener/lug nut 24) are driven at four times the torque (and at ¼ the speed) of the first socket opening 29. This gives tremendous mechanical advantage to the user. For example, the present tool 20 can be used by users of lesser strength, allowing them to still be able to break free a lug nut 24 on a tire. A scope of the present invention is believed to include other uses and applications of the torque multiplier tool as well. Once the fastener 24 is broken loose, the torque multiplier apparatus 20 can be flipped (including switching the detent stud 10 to the other side of the torque multiplier tool 22) with the driving tool 22 engaging the second socket opening 29A, such that the first socket opening 29 (and detent stud 10 and socket 21 and fastener 24) is driven at four times the speed (and only ¼ the torque) of the second socket opening 29A.

The present components of the torque multiplier apparatus 20 (FIG. 3) include: input pinion 1 (including the socket opening 29), input snap ring 2, input carrier 3, axle-forming dowel pins 4, planet pinion gears 5, gear housing head 6, input retainer 7 (including the socket opening 29A), assembly screws 8, long handle 9, and detent stud 10.

The input pinion 1 (FIG. 3) includes the first socket opening 29 on its outboard end, and gear teeth 30 on its other end. The detent stud 10 includes a square shaft configured to closely engage the socket opening 29 and includes spring-biased ball detents 31 shaped to frictionally engage recesses in the first socket opening 29, and retain the detent stud 10 in the first socket opening 29. The carrier 3 receives the geared end of the input pinion 1 and retains it using the snap ring 2. The dowels 4 extend between the input carrier 3 and the input retainer 7, and hold the four planet pinion gears 5 in position, with teeth of the planet pinion gears 5 engaging both the teeth on the input pinion 1 and engaging the teeth on the inside surface of the gear housing head 6. The torque multiplying mechanism is formed by the geared components 1, 5, 6 and other components operably connecting the first and second socket openings 29 and 29A.

Due to the existence of the four illustrated gears 5, the present assembly 20 provides a very robust and balanced assembly for handling stress during use. However, it is contemplated that the present apparatus 20 could instead use a different number of planet gears, such as fewer or more planet gears. The input retainer 7 is secured to the gear housing head 6 by assembly screws 8, and includes an outer section 32 forming the second socket opening 29A.

It is noted that by making the socket openings 29 and 29A identical sizes, the detent stud 10 can be switched between socket openings 29 and 29A (and also the driving tool 22 can be switched) such that the present apparatus 20 can be used to choose between a 4× torque advantage to break loose a tight fastener, or alternatively can be used to provide a 4× rotational speed advantage to run a loosened fastener along a threaded shaft until it runs off the end of the shaft. For example, the present apparatus 20 can be used to remove lug nuts 24 that secure a vehicle wheel to a vehicle, where the nuts must be first be broken free (which is difficult for some people of lesser upper body strength) and where the nuts must be run along a long threaded shaft that has grit, debris, damage, or corrosion on its threads (making it difficult to remove the nut using only one's fingers).

It is contemplated that the apparatus 20 can be adapted as desired for particular characteristics. For example, the present apparatus 20 is configured to provide a 4× torque advantage and speed reduction, but it is contemplated that the gears can be reconfigured to different sizes for a greater (or lesser) torque advantage. Also, it is noted that the present apparatus 20 includes 4 planet gears, which provide a balanced stress distribution during use. This potentially allows a lesser strength material to be used, such as aluminum or an alloy or a material heat treated for specific properties, while still providing optimal strength and durability in the product.

For example, the illustrated torque multiplier apparatus 20 includes a ½ inch female drive in and out with a removable double detent stud 10 that goes on either side. Thus, it can be flipped ("reversed") from the power side to the speed side (while using the same socket and driving tool 22) to selectively choose between a 4-to-1 power torque increase (and 1-to-4 speed decrease), or to a 1-to-4 power torque decrease (and 4-to-1 speed increase), depending on which side is up. The illustrated torque multiplier apparatus 20 weighs slightly less than 3.5 pounds with the reaction handle 9 attached, and is adapted for use with torques up to 550 ft-lbs. The handle 9 can be made removable in order to facilitate a more dense storage. The present apparatus 20 is affordable, lighter, smaller, and considerably less expensive than known prior art tools, and yet strong enough for most jobs. For example, the present apparatus 20 can be used in place of (and thus, it potentially replaces) a "cheater" pipe that is sometimes telescoped onto the handle of a ratchet wrench to form a longer handle for increased leverage.

It is contemplated that the present torque-multiplier tool 20 can be provided with an over-torque prevention mechanism. For example, by selecting a desired material for the detent stud 10, it can be made to torsionally shear at a torque of about 450 ft-lb, thus preventing an over-torque condition that would otherwise break or damage internal components of the torque-multiplier tool 20. This can be a great savings, since a replacement detent stud 10 is much lower cost than repairing an entire torque-multiplier tool 20. Also, the torsional shear of the detent stud 10 tends to non-catastropically fail, such as by a tearing action that gradually releases as it tears. This avoids a quick sharp release of torsional forces by the tool 20 upon failure. Notably, if a sharp release occurred, it might surprise a user and cause them to lose their balance. The shearable detent stud 10 can be made by alloy selection, or by thermo hardening, or by other mechanical and material choices to cause detent stud failure ahead of failure by the torque multiplier tool.

The present detent stud provides significant advantates. By having the detent stud be removable and replaceable, the detent stud then becomes a replaceable shear device, saving the tool. Also, the detent stud provides a safety aspect since it twists and gradually gives away more slowly than if the tool broke through catastrophic failure. Also, replacement of the detent stud is relatively lower cost than most parts of the tool, and also easier to replace. Also, by having a detent stud that prevents over-stress to the tool, the tool and torque-multiplier mechanism can be made of a lower torque rating and with lighter materials, used thus making shipping costs lower, resulting in a lower final price to the end user/customer.

It is to be understood that variations and modifications can be made on the aforementioned structure without departing from the concepts of the present invention; and further, it is to be understood that such concepts are intended to be covered by the following claims unless these claims by their language expressly state otherwise.

The embodiments of the invention in which an exclusive property or privilege is claimed are defined as follows:

1. A method comprising steps of:
   providing a torque multiplier tool with first and second identical input/output connectors operatively connected by a torque multiplying mechanism, a driving tool, and a fastener-nut-engaging socket, the first and second connectors on the multiplier tool each defining identical square sockets and the tool further including a detent stud defining identical opposing square-shafted ends both shaped to selectively matingly engage the square sockets and to engage a square socket on the fastener-nut-engaging socket; the driving tool defining a second mating square-shafted end identical to the opposing square-shafted ends;
   engaging the square-shafted end of the driving tool with the square socket of the second connector while engaging detent stud between the square socket of the first connector and the square socket of the fastener-nut-engaging socket;
   engaging the fastener-nut-engaging socket on a fastener and operating the driving tool to provide an increased torque on the fastener-nut-engaging socket to break loose the fastener from a tightened condition;
   flipping the torque multiplier tool and repositioning the detent stud from the square socket of the first connector to the square socket of the second connector and engaging the driving tool with the square socket of the first connector so that the driving tool directly engages the torque multiplier tool and the fastener-nut-engaging socket engages the detent stud which is in the second connector; and
   operating the driving tool to provide an increased speed of torsional rotation to run the fastener along a fastener-engaged shaft to more quickly remove the fastener from the shaft.

2. The method defined in claim 1, wherein providing the torque multiplier tool includes providing an over-torque prevention mechanism.

3. The method defined in claim 2, wherein the step of providing the detent stud includes forming the detent stud to fail at an over-torque condition that would otherwise deform or damage other components on the torque multiplier.

4. The method defined in claim 3, wherein the detent stud is designed to withstand less than 450 ft-lb of torque input.

5. The method defined in claim 3, wherein the torque multiplier tool including the torque multiplying mechanism is designed to withstand at least 550 ft-lb of torque.

6. The method defined in claim 3, wherein the detent stud is designed to torsionally fail upon receiving a torque of less than 450 ft-lb.

7. The method defined in claim 1, wherein the torque multiplier tool includes an input retainer, a gear housing, planetary gears, gear axles, a carrier, and input pinion, the input retainer forming the first connector and including a plurality of first holes to support planetary gear axles and a plurality of second holes to support assembly fasteners, the gear housing and the input pinion both including gear teeth operably engaging the planetary gears.

8. A torque multiplier driving system comprising:
   a torque multiplier apparatus having an input pinion; an input carrier; at least three planet pinion gears; a gear housing head; an input retainer and a long handle; the input carrier, pinion gears, gear housing head and input retainer operably engaging and forming a torque multiplier mechanism;
   the input pinion and the input retainer including first and second connectors respectively, with the first and second connectors, defining square sockets having an identical shape and size;
   a driving tool having a driving stub end operably engageable with the torque multiplier mechanism; and
   a square-shafted detent stud with identical square ends selectively positionable in either one of the square sockets of the first and second connectors, with the detent stud being adapted to replicate the driving stub end of the driving tool; the detent stud having a torsional shear strength less than a torsional strength of the torque multiplier mechanism and less than about 450 ft-lb of torque input;
   whereby the detent stud protects the torque multiplier mechanism against being overtorqued; and
   whereby an increased torque output can be achieved with reduced rotational speed by positioning the detent stud in one of the first and second connectors and the driving tool in the other of the first and second connectors, or alternatively, a reduced torque output can be achieved with increased rotational speed by positioning the detent stud in another of the first and second connectors and the driving tool in the other of the first and second connectors.

9. The torque multiplier apparatus defined in claim 8, wherein the torque multiplier tool further includes gear axels for holding the planet pinion gears, the input retainer forming the first connector and including a plurality of first holes to support the gear axles and a plurality of second holes to support assembly fasteners, the gear housing head and the input pinion both including gear teeth operably engaging the planet pinion gears.

* * * * *